US012706935B2

(12) United States Patent
Adivi et al.

(10) Patent No.: US 12,706,935 B2
(45) Date of Patent: Aug. 11, 2026

(54) SYSTEM AND METHOD FOR REAL-TIME MONITORING AND REMEDIATION OF NETWORK INTRUSION USING AN INTELLIGENT APPLICATION PROGRAMMING INTERFACE

(71) Applicant: BANK OF AMERICA CORPORATION, Charlotte, NC (US)

(72) Inventors: Suryanarayana Adivi, Hyderabad (IN); Pushkar Taneja, Hyderabad (IN); Shailendra Singh, Thane West (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 138 days.

(21) Appl. No.: 18/672,183

(22) Filed: May 23, 2024

(65) Prior Publication Data

US 2025/0365298 A1 Nov. 27, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS 8,769,412 B2 7/2014 Gill
9,225,686 B2 12/2015 Oliphant
9,692,789 B2 6/2017 Kirti
9,846,752 B2 12/2017 Nasle
10,019,677 B2 7/2018 Gill
10,027,711 B2 7/2018 Gill
10,154,047 B2 12/2018 Muddu
10,248,910 B2 4/2019 Crabtree
10,609,063 B1 3/2020 Oliphant
10,713,365 B2 7/2020 Biswas
10,873,595 B1 12/2020 Oliphant
11,055,417 B2 7/2021 Bhatia
11,165,800 B2 11/2021 Thampy
11,343,226 B2 5/2022 Goeringer
11,595,413 B2 2/2023 Ting
11,637,844 B2 4/2023 Shenoy
11,677,760 B2 6/2023 Shahbaz
(Continued)

*Primary Examiner* — Brian Whipple

(74) *Attorney, Agent, or Firm* — Moore & Van Allen PLLC; Nicholas C. Russell

(57) ABSTRACT

A system is provided for real-time monitoring and remediation of network intrusion using an intelligent application programming interface. In particular, the system may monitor and track, in real time, the various computing devices within a distributed networked system. The system may use one or more trained artificial intelligence models to analyze incoming network requests and detect anomalies within the body of network requests, and based on the analysis, implementing one or more countermeasures (e.g., request throttling, rate limiting, allocation of additional computing resources, and/or the like) in response. In some embodiments, the one or more AI models may be configured to generate intrusion mitigation and/or remediation plans in response to any detected anomalies. The output of the AI models may then be wrapped with additional data that may enhance the anomaly detection process.

17 Claims, 5 Drawing Sheets

(56) References Cited

U.S. PATENT DOCUMENTS

| | | | | |
|---|---|---|---|---|
| 11,757,907 | B1 | 9/2023 | Berger | |
| 2013/0219372 | A1* | 8/2013 | Li | G06F 8/443 717/128 |
| 2014/0115249 | A1* | 4/2014 | Jacobi | G06F 9/4881 711/108 |
| 2017/0063898 | A1* | 3/2017 | Muddu | H04L 63/1441 |
| 2020/0137097 | A1 | 4/2020 | Zimmermann | |
| 2022/0027431 | A1 | 1/2022 | Zheng | |
| 2022/0151019 | A1* | 5/2022 | Balasubramanian | H04W 76/34 |
| 2022/0174097 | A1 | 6/2022 | Biswas | |
| 2025/0240277 | A1* | 7/2025 | Pathak | H04L 63/1458 |

* cited by examiner

SYSTEM AND METHOD FOR REAL-TIME MONITORING AND REMEDIATION OF NETWORK INTRUSION USING AN INTELLIGENT APPLICATION PROGRAMMING INTERFACE

TECHNOLOGICAL FIELD

Example embodiments of the present disclosure relate to a system for real-time monitoring and remediation of network intrusion using an intelligent application programming interface.

BACKGROUND

There is a need for an intelligent, secure way to monitor API interactions to identify potentially unauthorized actions within a computing network environment.

BRIEF SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

A system is provided for real-time monitoring and remediation of network intrusion using an intelligent application programming interface. In particular, the system may monitor and track, in real time, the various computing devices within a distributed networked system. The system may use one or more trained artificial intelligence models to analyze incoming network requests and detect anomalies within the body of network requests, and based on the analysis, implementing one or more countermeasures (e.g., request throttling, rate limiting, allocation of additional computing resources, and/or the like) in response. In some embodiments, the one or more AI models may be configured to generate intrusion mitigation and/or remediation plans in response to any detected anomalies. The output of the AI models may then be wrapped with additional data that may enhance the anomaly detection process. In this way, the system provides an effective, secure way to detect, mitigate, and remediate network intrusions.

Accordingly, embodiments of the present disclosure provide a system for real-time monitoring and remediation of network intrusion using an intelligent application programming interface, the system comprising a processing device; a non-transitory storage device containing instructions when executed by the processing device, causes the processing device to perform the steps of monitoring, in real time, network data within a networked computing environment; analyzing the network data using an artificial intelligence ("AI") strategy model; determining, based on the AI strategy model analyzing the network data, a possibility of overload of the networked computing environment; initiating one or more remediation processes in response to the possibility of overload of the networked computing environment; based on an output of the AI strategy model, appending, to the network data, additional metadata associated with each network transaction within the network data using an AI-based wrapper model; based on an output of the wrapper model, performing anomaly detection of the network data using an AI-based anomaly detection model; and based on performing the anomaly detection, generating and implementing a mitigation plan to address one or more identified anomalies within the network data.

In some embodiments, monitoring the network data comprises intercepting one or more authentication requests through a proxy object; and performing one or more preliminary filtering processes on the one or more authentication requests, wherein the one or more preliminary filtering processes comprise rate limiting and IP address filtering of the one or more authentication requests.

In some embodiments, the one or more remediation processes in response to the possibility of overload of the networked computing environment comprises user based, application based, or device based rate limiting.

In some embodiments, the one or more remediation processes in response to the possibility of overload of the networked computing environment comprises temporary allocation of additional hardware resources for processing network requests, wherein the additional hardware resources comprise at least one of processing power, memory space, and network bandwidth.

In some embodiments, appending, to the network data, additional metadata comprises location, time frequency, endpoint access frequency, last attack time, and endpoint security policies.

In some embodiments, performing the anomaly detection comprises using a runtime-guided optimization process based on common intrusion patterns.

In some embodiments, performing the anomaly detection comprises processing the network data using thread-level speculation.

Embodiments of the present disclosure also provide a computer program product for real-time monitoring and remediation of network intrusion using an intelligent application programming interface, the computer program product comprising a non-transitory computer-readable medium comprising code causing an apparatus to perform the steps of monitoring, in real time, network data within a networked computing environment; analyzing the network data using an artificial intelligence ("AI") strategy model; determining, based on the AI strategy model analyzing the network data, a possibility of overload of the networked computing environment; initiating one or more remediation processes in response to the possibility of overload of the networked computing environment; based on an output of the AI strategy model, appending, to the network data, additional metadata associated with each network transaction within the network data using an AI-based wrapper model; based on an output of the wrapper model, performing anomaly detection of the network data using an AI-based anomaly detection model; and based on performing the anomaly detection, generating and implementing a mitigation plan to address one or more identified anomalies within the network data.

In some embodiments, monitoring the network data comprises intercepting one or more authentication requests through a proxy object; and performing one or more preliminary filtering processes on the one or more authentication requests, wherein the one or more preliminary filtering processes comprise rate limiting and IP address filtering of the one or more authentication requests.

In some embodiments, the one or more remediation processes in response to the possibility of overload of the networked computing environment comprises user based, application based, or device based rate limiting.

In some embodiments, the one or more remediation processes in response to the possibility of overload of the networked computing environment comprises temporary allocation of additional hardware resources for processing network requests, wherein the additional hardware resources comprise at least one of processing power, memory space, and network bandwidth.

In some embodiments, appending, to the network data, additional metadata comprises location, time frequency, endpoint access frequency, last attack time, and endpoint security policies.

In some embodiments, performing the anomaly detection comprises using a runtime-guided optimization process based on common intrusion patterns.

Embodiments of the present disclosure also provide a computer-implemented method for real-time monitoring and remediation of network intrusion using an intelligent application programming interface, the computer-implemented method comprising monitoring, in real time, network data within a networked computing environment; analyzing the network data using an artificial intelligence ("AI") strategy model; determining, based on the AI strategy model analyzing the network data, a possibility of overload of the networked computing environment; initiating one or more remediation processes in response to the possibility of overload of the networked computing environment; based on an output of the AI strategy model, appending, to the network data, additional metadata associated with each network transaction within the network data using an AI-based wrapper model; based on an output of the wrapper model, performing anomaly detection of the network data using an AI-based anomaly detection model; and based on performing the anomaly detection, generating and implementing a mitigation plan to address one or more identified anomalies within the network data.

In some embodiments, monitoring the network data comprises intercepting one or more authentication requests through a proxy object; and performing one or more preliminary filtering processes on the one or more authentication requests, wherein the one or more preliminary filtering processes comprise rate limiting and IP address filtering of the one or more authentication requests.

In some embodiments, the one or more remediation processes in response to the possibility of overload of the networked computing environment comprises user based, application based, or device based rate limiting.

In some embodiments, the one or more remediation processes in response to the possibility of overload of the networked computing environment comprises temporary allocation of additional hardware resources for processing network requests, wherein the additional hardware resources comprise at least one of processing power, memory space, and network bandwidth.

In some embodiments, appending, to the network data, additional metadata comprises location, time frequency, endpoint access frequency, last attack time, and endpoint security policies.

In some embodiments, performing the anomaly detection comprises using a runtime-guided optimization process based on common intrusion patterns.

In some embodiments, performing the anomaly detection comprises processing the network data using thread-level speculation.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
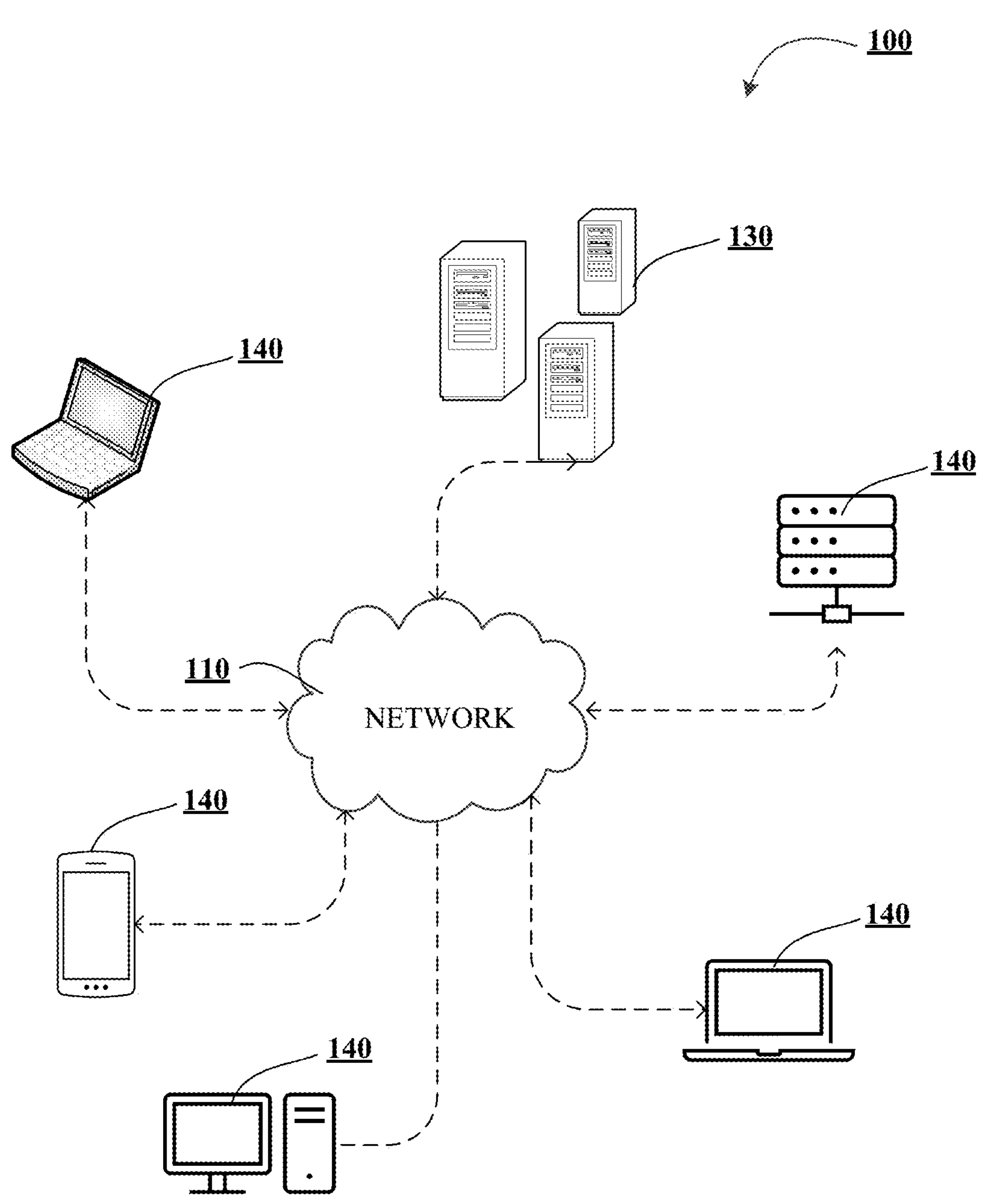
Figure 1B:
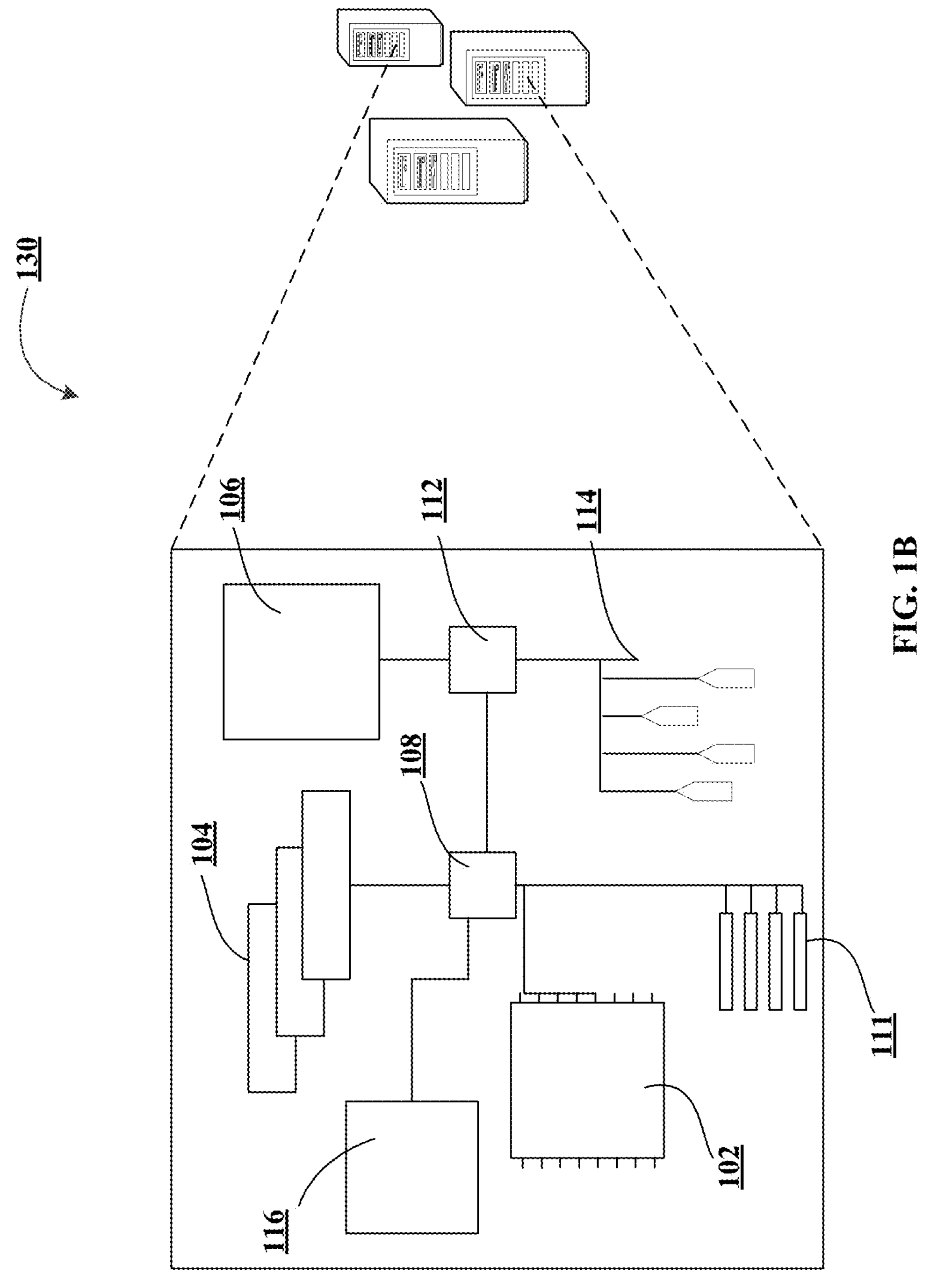
Figure 1C:
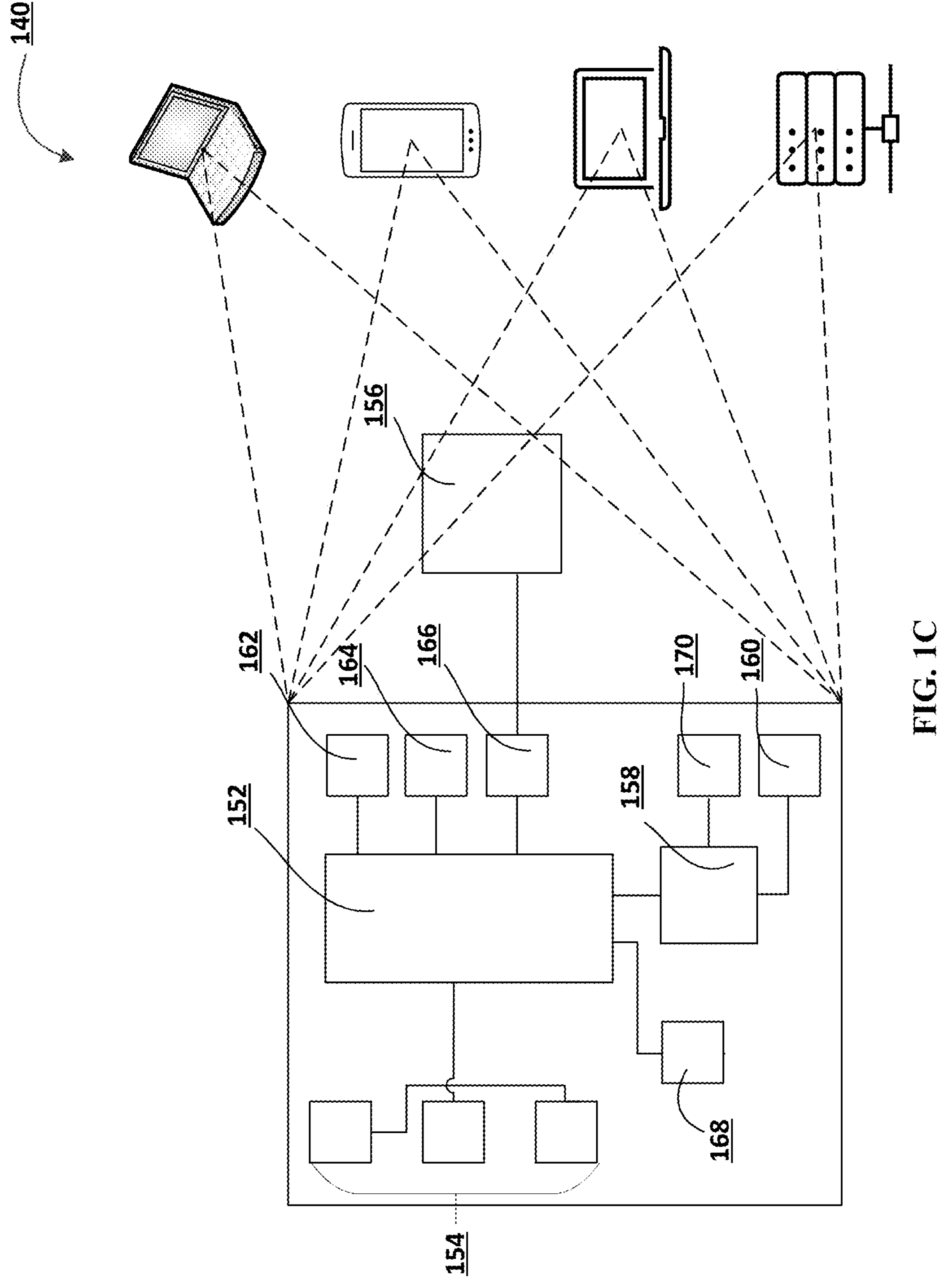
Figure 2:
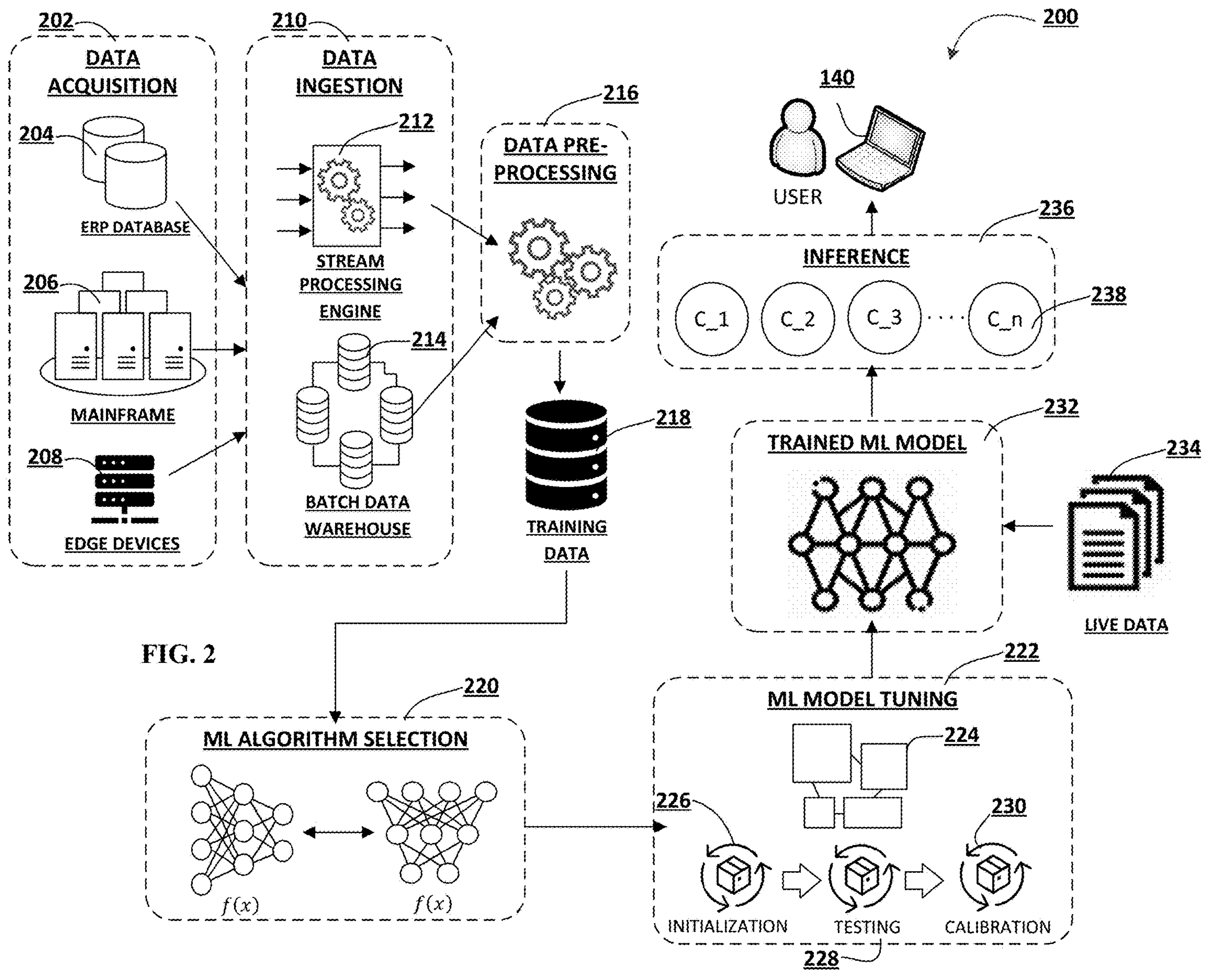
Figure 3:
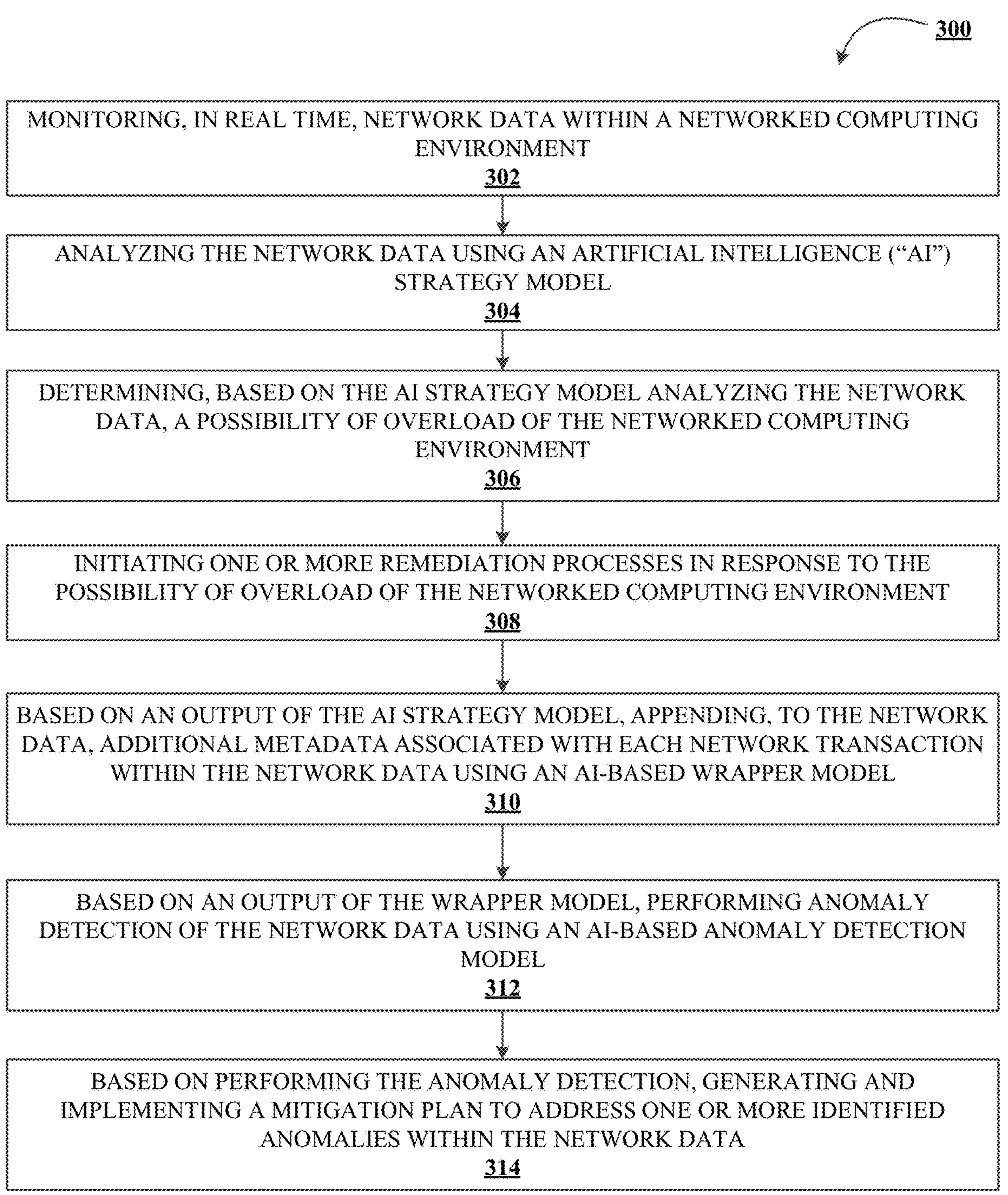

FIGS. 1A-1C illustrates technical components of an exemplary distributed computing system for real-time monitoring and remediation of network intrusion using an intelligent application programming interface, in accordance with an embodiment of the disclosure;

FIG. 2 illustrates an exemplary machine learning subsystem architecture, in accordance with an embodiment of the invention; and FIG. 3 illustrates a method for real-time monitoring and remediation of network intrusion using an intelligent application programming interface, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, unique characteristic information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, "resource" may refer to a tangible or intangible object that may be used, consumed, maintained, acquired, exchanged, and/or the like by a system, entity, or user to accomplish certain objectives. Accordingly, in some embodiments, the resources may include computing resources such as processing power, memory space, network bandwidth, bus speeds, storage space, electricity, and/or the like. In other embodiments, the resources may include objects such as electronic data files or values, authentication keys (e.g., cryptographic keys), document files, funds, digital currencies, and/or the like.

In networked computing environments, application programming interfaces ("APIs") may be implemented to communicatively connect computing devices and/or applications with one another. That said, implementations of APIs within the network environment may expose potential vulnerabilities that may allowed potentially unauthorized users, devices, and/or applications to gain access to the underlying devices, data, and/or applications that are part of the API implementation. For instance, an API vulnerability may exist that allows an unauthorized user to access, modify, and/or exfiltrate sensitive information (e.g., personal identifiable information, or "PII"). In other cases, unauthorized users may make use of an API's functionality to perform on-path attacks to intercept communications between devices or applications in the network environment to gain unauthorized access to sensitive data. In yet other scenarios, the unauthorized users may perform a distributed denial-of-service ("DDOS") attack to overwhelm the computing capabilities of the network, thereby causing certain resources or services of the network to become unavailable. Accordingly, there is a need for an intelligent and efficient way to identify and prevent API intrusions within the network.

To address the above concerns among others, the system described herein provides a way to intelligently monitor, prevent, and remediate network intrusions using artificial intelligence ("AI"). As an overview, the system may monitor the network traffic within a network environment to identify one or more metrics associated with the network traffic, where the metrics may include information or metadata such as network behavior, message type and/or priority, sensitivity, frequency, data volume, location data, device-specific data, user-specific data, and/or the like. In some embodiments, incoming network messages or requests (e.g., authentication requests) may be processed by a proxy object that may perform one or more preliminary checks and/or filtering steps. For instance, the proxy object may perform rate limiting and/or filtering of incoming requests upon detecting repeated requests from the same application and/or device (e.g., based on IP addresses, MAC addresses, device IDs, and/or the like). By using the proxy object to intercept incoming requests, the system may intelligently limit the number of unnecessary requests that are inputted into the AI model, which in turn increases the computational speed of the anomaly detection process.

The system may train an AI and/or machine learning ("ML") model based on historical data regarding past instances of network intrusion, network overloading, remediation, and/or the like, such that the AI model may be able to intelligently assess a network state in order to recognize potential attack patterns, states of resource exhaustion or overloading, existing vulnerabilities, and/or the like, and dynamically implement one or more remediation processes in response to detecting the issues within the network environment. It should be understood that while reference may be made to an "AI model," the "AI model" may comprise more than one AI model that may be implemented as part of an overall AI-based process. For instance, upon detecting a situation that may result in exhaustion of network resources (e.g., a period of unusually high request volume, or a DDOS attack), an AI-based strategy model may automatically and dynamically implement throttling or rate limiting (which may include either or both global and per-application or per-device limiting) to prevent the overloading or exhaustion state from occurring. In this regard, the strategy model may be configured to recognize conditions or scenarios that would cause an overloading of the network, such as high request complexity, high priority, unstructured or varying request data formats or data types, and/or the like. In some embodiments, the AI strategy model may further allocate additional hardware resources (e.g., memory allocation, processing power, networking bandwidth, and/or the like) on a temporary basis to address the unforeseen increase in incoming network requests.

In some embodiments the system may use one or more compiler optimization processes to improve the performance of the intelligent anomaly detection process. For instance, the system may use a runtime-guided optimization process that may gather runtime information related to the types of attacks frequently encountered by the network (e.g., frequently executed code paths), and optimizes the AI model to focus on the most frequently encountered attacks, thereby increasing the efficiency and speed of the anomaly detection process. In some embodiments, the optimization processes may further include parallel processing through thread-level speculation ("TLS"), whereby potentially dependent instructions may be executed in parallel by executing the instructions speculatively in multiple threads. By using TLS in this manner, the system may greatly increase the throughput of the anomaly detection process, which in turn increases the resolution speed of the anomaly detection process.

Once the strategy model has analyzed the incoming API requests and performed the rate limiting and/or resource allocation processes, the output of the strategy model may be processed by a wrapper model, where the wrapper model may add additional details and/or metadata to each network transaction, where the additional details may include information such as last API endpoints requested (e.g., the last 5, last 10, last 20, and/or the like), API attack patterns or history, API-specific feature information (e.g., response time, success rate, error rate, and/or the like), IP blocking details, data features, and/or the like.

The wrapper model may further perform optimizations on the monitored data, such as deduplication of requests (e.g., removal of duplicate API requests), data format transformations (e.g., reformatting requests according to application or user-defined preferences or parameters to make the requests more suitable to process or integrate into other systems and/or processes), prioritization of requests (e.g., assigning priority levels to the various requests based on factors such as user type, subscription level, organizational rules or policies, and/or the like), input sanitization (e.g., cleaning and/or sanitization of input data to prevent potential vulnerabilities, such as a SQL injection or cross-site scripting attack), request routing (e.g., modification of API request routing logic based on user-defined preferences, organizational rules, and/or the like), request authorization (e.g., validation and authorization of API requests based on access control policies or user permissions), response compression (e.g., compression of API response data before sending it back to the requester, thereby optimizing network bandwidth and increasing processing speed), response caching (e.g., caching of API request responses that are commonly made, thereby increasing the response speed of subsequent identical requests), and/or the like.

Once the wrapper model has performed its processes on the monitored data, an anomaly detection model may analyze the monitored data (which has been enriched with data by the wrapper model) and identify one or more anomalies within the API/network requests in the monitored data. For instance, the anomaly detection model may use one or more anomaly detection patterns, which may comprise behavior change pattern (e.g., detection of anomalies by monitoring changes in user behavior, such as sudden spikes or drops in activity levels), hashing verification (e.g., use of hashing to verify data integrity), time series analysis (e.g., analysis of time-dependent data), clustering-based anomaly detection (e.g., grouping of similar data points and identifying outliers), statistical deviation (e.g., use of statistical techniques to identify anomalies), machine learning-based anomaly detection (e.g., use of trained models based on historical data to detect anomalies), network traffic analysis (e.g., monitoring network traffic to identify abnormal traffic patterns, which may include an unusually high number of failed connections, unexpected ports, unexpected protocols, and/or the like), contextual anomaly detection (e.g., detection of anomalies based on context of the data), graph-based anomaly detection (e.g., use of graph analysis techniques to identify anomalies), ensemble anomaly detection (e.g., combination of various anomaly detection patterns), and/or the like.

Once an anomaly has been detected by the anomaly detection model, a remediation model or prevention model may intelligently generate a mitigation or remediation plan to address the identified anomalies. For instance, if the anomaly includes an API intrusion based on a vulnerability within a specific version of the API, the remediation plan may include a software update to address the vulnerability. On the other hand, if the anomaly relates to a vulnerability within specific devices or endpoints, the remediation plan may include measures such as network isolation or segmentation of the endpoint, removal of vulnerable components, reformatting or reset of the endpoint, and/or the like.

In some embodiments, a notification model may automatically generate a notification to be transmitted to one or more users associated with the network (e.g., network administrators, developers, and/or the like). In this regard, the notification model may comprise a natural language processing ("NLP")/natural language generation ("NLG") model that may process the remediation plan generated by the remediation model and generate an overview or explanation of the remediation plan to be included within the notification. In this way, the system may intelligently and efficiently remediate API vulnerabilities within the network environment.

The system as described herein provides a number of technological benefits over conventional network security methods. For instance, by using an AI-based strategy model, the system may intelligently and dynamically identify instances that would exhaust the computing resources of the network and remediate such instances in real time (e.g., through rate limiting and/or additional resource allocation), thereby preempting instances of overloading or resource exhaustion. Furthermore, by using a wrapper model to provide additional details on network transactions as well as performing optimizations on the monitored data, the system may greatly increase the efficiency, accuracy, and speed of the anomaly detection process.

Turning now to the figures, FIGS. 1A-1C illustrate technical components of an exemplary distributed computing environment 100 for the system for real-time monitoring and remediation of network intrusion using an intelligent application programming interface. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. For instance, the functions of the system 130 and the endpoint devices 140 may be performed on the same device (e.g., the endpoint device 140). Also, the distributed computing environment 100 may include multiple systems, same or similar to system 130, with each system providing portions of the necessary operations (e.g., as a server bank, a group of blade servers, or a multiprocessor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it. In some embodiments, the system 130 may provide an application programming interface ("API") layer for communicating with the end-point device(s) 140.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as servers, networked storage drives, personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102 (which may also be referred to herein as a "processing device"), memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method ((e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a method 300 for real-time monitoring and remediation of network intrusion using an intelligent application programming interface. As shown in block 302, the method includes monitoring, in real time, network data within a networked computing environment. In this regard, the network data monitored by the system may comprise various types of network traffic information associated with the computing device within the networked computing environment, including metadata such as API request information, endpoint information, ports accessed, resources requested, request/protocol type, data payloads, priority of requests, request sensitivity, request frequency, data volume, and/or the like. In some embodiments, the system may use a proxy object to intercept authentication requests and perform one or more preliminary filtering steps on the incoming authentication requests, where the preliminary filtering steps may include rate limiting and/or IP address based filtering of the incoming authentication requests.

Next, as shown in block 304, the method includes analyzing the network data using an artificial intelligence ("AI") strategy model. In particular, the AI strategy model may analyze portions of the network data (e.g., the volume of API requests) that has been pre-filtered by the proxy model. The AI strategy model may be trained on historical network data patterns associated with past instances of network overloading.

Next, as shown in block 306, the method includes determining, based on the AI strategy model analyzing the network data, a possibility of overload of the networked computing environment. In this regard, the overload of the networked computing environment may include instances such as server or resource unavailability, processing or networking delays, long login queue times, network unresponsiveness, and/or the like.

Next, as shown in block 308, the method includes initiating one or more remediation processes in response to the possibility of overload of the networked computing environment. For instance, the one or more remediation processes may include throttling or rate limiting of API requests. The rate limiting may be user based, application based, device based, and/or the like, where a limit is set for the number of requests that may be received from a given unit entity for a particular time frame. Additionally or alternatively, the system may allocate additional hardware resources (e.g., processing power, memory space, networking bandwidth, and/or the like) on a temporary basis to address the large volume of API requests.

Next, as shown in block 310, the method includes, based on an output of the AI strategy model, appending, to the network data, additional metadata associated with each network transaction within the network data using an AI-based wrapper model. The wrapper model may perform one or more data enrichment processes on the output of the strategy model, such as prioritization of requests, validation and sanitization of data, deduplication, payload inspection, data transformation, and/or the like. In some embodiments, the wrapper model may add additional information regarding the various requests, such as location, time, frequency, endpoint access frequency, last attack time, endpoint security policies, and/or the like.

Next, as shown in block 312, the method includes, based on an output of the wrapper model, performing anomaly detection of the network data using an AI-based anomaly detection model. The detection model may be configured to recognize the various attack methods and patterns on an API within the networked computing environment and detect one or more intrusions into the API. In this regard, the system may use one or more optimization processes to improve the performance of the analysis of the network data. For instance, the one or more optimization processes may include a runtime-guide optimization process through which the compiler gathers data on common network attacks and optimizes the detection of the most commonly encountered network attacks. Furthermore, the one or more optimization processes may include thread-level speculation, whereby potentially dependent instructions are executed in parallel in speculative processing threads.

Next, as shown in block 314, the method includes, based on performing the anomaly detection, generating and implementing a mitigation plan to address one or more identified anomalies within the network data. In some embodiments, the mitigation plan may include one or more remediation process, such as applying a software update or patch, performing network segmentation of compromised devices, deletion or removal of vulnerable software and/or hardware components, and/or the like. In this way, the system may provide a secure and efficient way to detect and remediate network intrusions.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for real-time monitoring and remediation of network intrusion using an intelligent application programming interface, the system comprising:

a processing device;

a non-transitory storage device containing instructions when executed by the processing device, causes the processing device to perform the steps of:

monitoring, in real time, network data within a networked computing environment;

analyzing the network data using an artificial intelligence ("AI") strategy model;

determining, based on the AI strategy model analyzing the network data, a possibility of overload of the networked computing environment;

initiating one or more remediation processes in response to the possibility of overload of the networked computing environment;

based on an output of the AI strategy model, appending, to the network data, additional metadata associated with each network transaction within the network data using an AI-based wrapper model, wherein the additional metadata comprises location, time frequency, endpoint access frequency, last attack time, and endpoint security policies;

based on an output of the wrapper model, performing anomaly detection of the network data using an AI-based anomaly detection model; and based on performing the anomaly detection, generating and implementing a mitigation plan to address one or more identified anomalies within the network data.

2. The system of claim 1, wherein monitoring the network data comprises:

intercepting one or more authentication requests through a proxy object; and performing one or more preliminary filtering processes on the one or more authentication requests, wherein the one or more preliminary filtering processes comprise rate limiting and IP address filtering of the one or more authentication requests.

3. The system of claim 1, wherein the one or more remediation processes in response to the possibility of overload of the networked computing environment comprises user based, application based, or device based rate limiting.

4. The system of claim 1, wherein the one or more remediation processes in response to the possibility of overload of the networked computing environment comprises temporary allocation of additional hardware resources for processing network requests, wherein the additional hardware resources comprise at least one of processing power, memory space, and network bandwidth.

5. The system of claim 1, wherein performing the anomaly detection comprises using a runtime-guided optimization process based on common intrusion patterns.

6. The system of claim 1, wherein performing the anomaly detection comprises processing the network data using thread-level speculation.

7. A computer program product for real-time monitoring and remediation of network intrusion using an intelligent application programming interface, the computer program product comprising a non-transitory computer-readable medium comprising code causing an apparatus to perform the steps of:

monitoring, in real time, network data within a networked computing environment;

analyzing the network data using an artificial intelligence ("AI") strategy model;

determining, based on the AI strategy model analyzing the network data, a possibility of overload of the networked computing environment;

initiating one or more remediation processes in response to the possibility of overload of the networked computing environment;

based on an output of the AI strategy model, appending, to the network data, additional metadata associated with each network transaction within the network data using an AI-based wrapper model, wherein the additional metadata comprises location, time frequency, endpoint access frequency, last attack time, and endpoint security policies;

based on an output of the wrapper model, performing anomaly detection of the network data using an AI-based anomaly detection model; and based on performing the anomaly detection, generating and implementing a mitigation plan to address one or more identified anomalies within the network data.

8. The computer program product of claim 7, wherein monitoring the network data comprises:

intercepting one or more authentication requests through a proxy object; and performing one or more preliminary filtering processes on the one or more authentication requests, wherein the one or more preliminary filtering processes comprise rate limiting and IP address filtering of the one or more authentication requests.

9. The computer program product of claim 7, wherein the one or more remediation processes in response to the possibility of overload of the networked computing environment comprises user based, application based, or device based rate limiting.

10. The computer program product of claim 7, wherein the one or more remediation processes in response to the possibility of overload of the networked computing environment comprises temporary allocation of additional hardware resources for processing network requests, wherein the additional hardware resources comprise at least one of processing power, memory space, and network bandwidth.

11. The computer program product of claim 7, wherein performing the anomaly detection comprises using a runtime-guided optimization process based on common intrusion patterns.

12. A computer-implemented method for real-time monitoring and remediation of network intrusion using an intelligent application programming interface, the computer-implemented method comprising:

monitoring, in real time, network data within a networked computing environment;

analyzing the network data using an artificial intelligence ("AI") strategy model;

determining, based on the AI strategy model analyzing the network data, a possibility of overload of the networked computing environment;

initiating one or more remediation processes in response to the possibility of overload of the networked computing environment;

based on an output of the AI strategy model, appending, to the network data, additional metadata associated with each network transaction within the network data using an AI-based wrapper model, wherein the additional metadata comprises location, time frequency, endpoint access frequency, last attack time, and endpoint security policies;

based on an output of the wrapper model, performing anomaly detection of the network data using an AI-based anomaly detection model; and based on performing the anomaly detection, generating and implementing a mitigation plan to address one or more identified anomalies within the network data.

13. The computer-implemented method of claim 12, wherein monitoring the network data comprises:

intercepting one or more authentication requests through a proxy object; and performing one or more preliminary filtering processes on the one or more authentication requests, wherein the one or more preliminary filtering processes comprise rate limiting and IP address filtering of the one or more authentication requests.

14. The computer-implemented method of claim 12, wherein the one or more remediation processes in response to the possibility of overload of the networked computing environment comprises user based, application based, or device based rate limiting.

15. The computer-implemented method of claim 12, wherein the one or more remediation processes in response to the possibility of overload of the networked computing environment comprises temporary allocation of additional hardware resources for processing network requests, wherein the additional hardware resources comprise at least one of processing power, memory space, and network bandwidth.

16. The computer-implemented method of claim 12, wherein performing the anomaly detection comprises using a runtime-guided optimization process based on common intrusion patterns.

17. The computer-implemented method of claim 12, wherein performing the anomaly detection comprises processing the network data using thread-level speculation.

* * * * *